United States Patent [19]

Kromrey

[11] Patent Number: 5,009,687

[45] Date of Patent: Apr. 23, 1991

[54] METHOD OF MOLDING A COMPOSITE ARTICLE USING SOFTENED GLASS AS A PRESSURE TRANSMITTING MEDIUM

[75] Inventor: Robert V. Kromrey, Campbell, Calif.

[73] Assignee: United Technologies Corporation, Hartford, Conn.

[21] Appl. No.: 416,212

[22] Filed: Oct. 2, 1989

[51] Int. Cl.$^5$ ............................................. B29C 43/10
[52] U.S. Cl. ................................. 65/18.1; 264/257; 264/313; 264/324; 264/510; 425/405.2; 419/5; 419/42
[58] Field of Search ............... 425/405.1, 405.2; 264/102, 510, 511, 257, 258, 313, 324; 65/18.1, 3.43; 428/426, 457; 419/5, 42

[56] References Cited

U.S. PATENT DOCUMENTS

| | | | |
|---|---|---|---|
| 4,311,661 | 1/1982 | Palmer | 264/102 |
| 4,428,906 | 1/1984 | Rozmus | 425/405.1 |
| 4,478,626 | 10/1984 | Moritoki | 425/405.2 |
| 4,515,611 | 5/1985 | Bhatti | 425/405.2 |
| 4,561,870 | 12/1985 | Bhatti | 425/405.2 |
| 4,582,682 | 4/1986 | Betz | 425/405.2 |
| 4,627,864 | 12/1986 | Bhatti | 425/405.2 |
| 4,656,002 | 4/1987 | Lizenby | 425/405.2 |
| 4,704,240 | 11/1987 | Reavely | 264/257 |
| 4,785,574 | 11/1988 | Fiorentino | 425/405.2 |

Primary Examiner—Jay H. Woo
Assistant Examiner—Jeremiah F. Durkin, II

[57] ABSTRACT

A method for molding high temperature composites that transmits more uniform pressures to the surface of the composites. A compliant glass, glass-ceramic, or ceramic layer is caused to apply pressure to a composite precursor and heat is applied to the composite precursor to form a composite.

9 Claims, 2 Drawing Sheets

METHOD OF MOLDING A COMPOSITE ARTICLE USING SOFTENED GLASS AS A PRESSURE TRANSMITTING MEDIUM

TECHNICAL FIELD

The field of art to which this invention pertains is methods for molding composite articles.

BACKGROUND ART

There are a variety of methods of molding articles. These include autoclaves, hydroclaves and compression molding. Particularly for high temperature molding (e.g., polyimide resins) one isostatic molding process has shown great advantage over other methods. This method is described in commonly assigned European Patent Application No. 87630010.4 entitled "Molding Method and Apparatus Using a Solid, Flowable, Polymer Medium" to Kromrey. An article is molded by contacting it with a solid polymer medium, such as an especially low strength unfilled silicone rubber which is solid and able to flow readily. Thermal expansion of the medium or mechanical force is used to create molding pressure and thereby provides a substantially uniform pressure on the article precursor. Various temperature and pressure cycles can be attained; constant high pressures can be maintained on the article precursor during cooldown, optionally aided by flowing of medium to and from a vessel in which the article precursor is being molded. The method is particularly adapted to molding filler or fiber reinforced thermosetting polymer composite articles.

In addition, the process may be used at higher temperatures for the molding of glass matrix (compglas) composites, etc. Molding at very high temperature, under isostatic pressure conditions, presents difficult load transfer problems. Molding an article against a forming mandrel or tool requires an even application of pressure onto the surface to ensure proper thickness control. If the pressure is not substantially even, the matrix material of the composite can be forced into a lower pressure region. This results in poor distribution of fibers and matrix material.

Application of isostatic pressure by the thermal expansion of a polymeric medium has been effective at temperatures under 1000° F. If higher temperatures are used, the media must be protected by an insulative layer of thermally resistant material. The thickness of this layer is dictated by the temperature drop required to protect the organic medium. If this layer becomes too thick, it cannot properly transmit the molding pressure to surfaces which are not substantially flat.

Thus, there has been a continuing search in this field of art methods of transferring pressure at high temperatures.

DISCLOSURE OF INVENTION

This invention is directed to a method for molding high temperature composites that transmits more uniform pressures to the surface of the composites. The method comprises causing a compliant glass, glass-ceramic, or ceramic layer to apply pressure to a composite precursor and applying heat to the composite precursor to form a composite.

The foregoing and other features and advantages of the present invention will become more apparent from the following description and accompanying drawing.

BEST MODE FOR CARRYING OUT THE INVENTION

Figure 1:
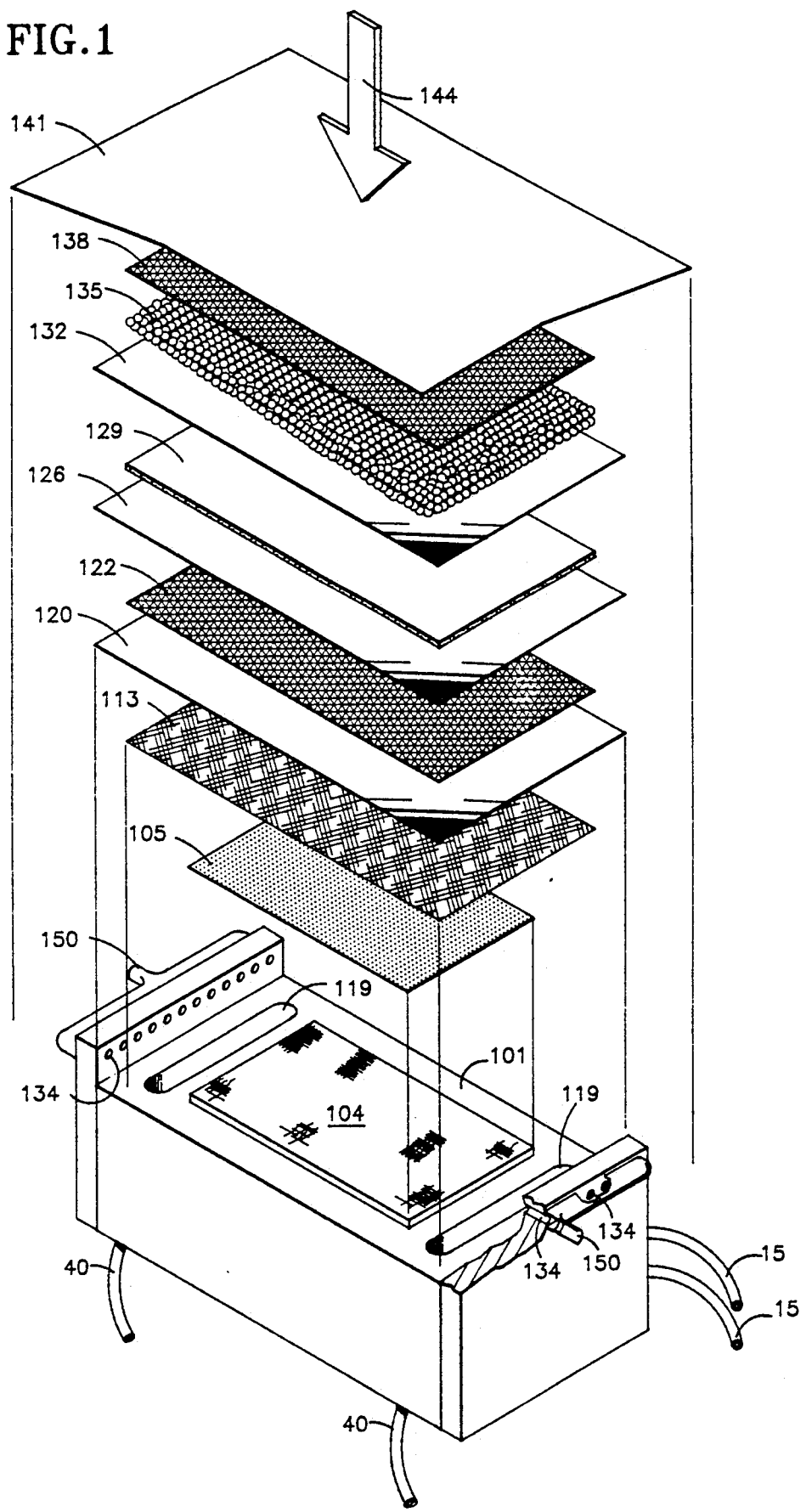
FIG. 1 illustrates an exploded perspective view, partly cutaway and partly in-section, of a composite layup and the various pressure transfer and insulative layers used, including the exemplary glass pressure transfer material of this invention.

A clearer understanding of this invention may be had by reference to FIG. 1. An article 104 to be molded (i.e., prepreg) is disposed next to a tool 101 (e.g., graphite, ceramic, steel, copper). Typically, a release material 105 is disposed between the part 104 and subsequent layers to aid in post molding separation. A breather layer 113 may be disposed next to the release layer 105 and serves as the main lateral fluid flow path for condensation liquids and gases (either gases released from resin containing parts 104 or air from interstices within metal matrix and ceramic part precursors) as they are drawn to a vent 119 in the tool 101. Typically, a barrier 120 envelopes the above assembly separating it from the insulating layer 129 (described hereafter) for applications where very high temperatures are encountered (i.e., carboncarbon). Thus, barrier 120 is sealed to the tool 101 covering the vacuum vents 119. A layer of compliant glass 122 (described in detail hereafter) is disposed between the above layers and the convective cooling layer 135 (glass bead layer described hereafter). Insulating layer 129 (enveloped in foil barriers 126, 132) may be used to separate the convective cooling layer 135 from the compliant glass layer 122 so that the convective cooling layer 135 does not chill and thus solidify the compliant glass layer 122. Barriers 126, 132 are sealed to the tool 101 and extend beyond the barrier 120. Convective cooling layer 135 is in communication with vents 134 through which inert cooling gases flow and also with manifolds 150. The above layers and particularly the convective cooling layer 135 is disposed between the part 104 which is heated by the tool 101 and the pressure means to protect the pressure means (e.g., solid flowable polymer media 144 described hereinafter) from excessive elevated temperatures (i.e., above about 1000° F.). A layer of glass fabric 138 may be used to separate the convective cooling layer 135 from the subsequent layers so that any surface unevenness of the convective cooling layer 135 does not result in damage to any subsequent layers. Another barrier 141 envelops the entire assembly separating it from the pressure means. Barrier 141 is sealed to tool 101 covering the vents 134 and convective cooling layer 135.

It has been found that the use of a porous ceramic bead layer (convective cooling layer 135) for convective cooling can have problems. This layer is very efficient for cooling, but may not conform well to the surface of an article being molded. As the material being molded becomes molten and compresses, a volumetric reduction of the composite may cause the surface to change its position in accordance with the force applied. If the force is being exerted by a noncompliant medium it will assume whatever shape the interfacial layer becomes. Therefore, the surface of the part can be severely distorted if the cooling layer material is crumpled or fractured during movement.

In addition, damage can occur when high modulus fibers are used in composites since the fibers are brittle, and are subject to damage by shearing and crushing. Pressure is typically applied to a composite only after the matrix has been heated enough to soften and flow. Premature force can cause the rigid matrix material to macerate the stiff reinforcement fibers. This is particularly a problem when the article being molded has a complex configuration. Lack of compliant molding materials can result in thinning of edges and sharp corners and indentations from fracture planes. Unlike thermosetting resins, glass and metal matrices become more fluid at high temperature. Therefore, an effective cushion is needed during the critical molding step.

To obviate these problems, a layer of molten glass is used to form a compliant interface between the composite 104 and the convective cooling layer 135 (i.e., glass or ceramic beads). Thus, the compliant layer 122 cushions the composite to prevent damage to the reinforcing fibers. The thickness of the compliant glass layer 122 may vary without deleteriously affecting the cushioning of the article 104 being formed from the somewhat rigid convection cooling layer 135. It is preferred that the layer be sufficiently thick to avoid penetration by fracture planes of the more rigid insulation and convective cooling layers. Preferably, the layer is about 0.5 cm to about 2.0 cm because the layer should be sufficiently thick to allow penetration by subsequent layers. Thicker parts would typically utilize correspondingly thicker molten layers.

Selection of melting points for the compliant materials is dependent on the softening temperature of the composite matrix material. For example, when used in molding glass matrix (i.e., glass, ceramic or glass-ceramic) composites, it is preferred that the compliant layer 122 has a softening point lower than the matrix because it will cushion the fiber/powder preform 104 during pressure application. When used in molding metal matrix composites, it is preferred that the compliant layer 122 has a softening point lower than the metal matrix because it will cushion the metal coated fibers. Typically, a difference of at least about 200° F. to about 300° F. ensures that the compliant layer is soft enough to distribute the load uniformly. In instances when very thin articles (i.e., 0.05 cm to 0.20 cm) are being made, it may be desirable to narrow the difference to about 50° F. to about 200° F. because heating through the thickness is more rapid. A combination of glass layers having different softening points is preferred when the thickness of the convective cooling layer 135 becomes too thick for a single layer to control. This is accomplished with two or more layers of material having distinctly different softening points. By this means, the layer closest to the article has the lowest viscosity, and each additional cushioning layer is more viscous. A higher viscosity near the rigid interface better supports the convective cooling layer 135.

Any glass, glass-ceramic, or ceramic may be used as the compliant layer that results in the desired softening point) at the highest temperatures used for the particular molding application. Ceramic glasses, such as quartz, Astrosil ($SiO_2$), and Nextel (alumina, boria, silica) are preferred for molding temperatures from about 2800° F. to about 3100° F. E-glass (borosilicate) is preferred for intermediate molding temperatures of 1500° F. to about 2300° F. and sodium silicate glass is preferred for lower molding temperatures from about 900° F. to about 1400° F. For molding fiber reinforced glass-ceramic composites such as COMPGLASS (TM) composites (United Technologies) borosilicate glasses such as Corning 7740 and 770 glasses are especially preferred because their softening points are suitable.

The compliant glass layer 122 is typically applied as layers of powdered or spherical particles. Glass fabric facings can also be used to envelop these particulate materials. Fabrics are typically selected that have a melting point similar to or higher than the particulate material. Exemplary fabrics include Astroquartz, Nextel, and E-Glass. Typically, free-flowing materials are poured into a cavity between layers of metal foil, or are applied as prepared sheet stock. Cavities are formed with a desired shape which ensures an even thickness. Sheet stock materials are supported by thin fabric scrims to provide flexible layers having a controlled thickness. The scrims act to form "skins" on the outside surfaces of the sheet stock. The sheet material is easily cut to suitable sizes to conform to complex shapes without the need for tailored foil barriers. A typical sheet stock is formed by laying down a thin scrim of nylon or acrylic stretch fabric. A 0.25 inch thick layer of powdered glass (random particle sizes to promote maximum packing), is mixed in a fugitive binder (described below). Then a top layer of fabric is layered over the sheet. The layer is then oven- or air-dried.

Fugitive binders may be used for preparation of the flexible compliant layers. Preferably, the binder may be used in close proximity with the article being molded without deleterious effects. Gases released when the binder is thermally destroyed can be removed from the system through the breather layer 113. High temperature silicone resins may also be useful binders because they will volatilize, leaving a small quantity of harmless silica residue. An exemplary binder is G.E. PSA-529 binder, available from General Electric.

Various release layers 105 may be used to isolate the breather layer 113 from the composite 104. Typically, porous materials are used for molding resins containing volatiles and nonporous metal films are used for molding glass-ceramic and metal matrix materials. Selection of a particular barrier material also depends on the end use temperature. Exemplary porous materials are perforated molybdenum foil, ARMALON TEFLON (TM) coated glass fabric, E.I. DuPont DeNemours, colloidal graphite on a scrim carrier, GRAPHOIL (TM) sheet material, available from Union Carbide, etc. Powdered release materials may be carried on a scrim to facilitate handling. Exemplary scrims include open weave glass or ceramic fabrics. An exemplary release material layer is ARMALON (TM) Teflon coated glass available from T.M.I. Inc. Salt Lake City, Utah. There are a variety of metal foils that are suitable. Stainless steel, for instance, can be used at temperatures up to about 1800° F. Superalloys are suitable for use at temperatures from about 2000° F. to about 2500° F. and above.

The breather layer 113 typically comprises glass fabric for applications where metal matrix composites or glass-ceramic composites are made. Glass fabric has sufficient gas pathways to remove the air initially present in these composites during the initial low pressure molding stages. For applications where resin composites are molded at high pressures, a breather layer that maintains sufficient gas pathways at high pressures must be used. Glass or ceramic bead layers such as those described below are suitable.

A description of the beaded thermal insulation layer 129 and convective cooling layer 135 follows. Any good insulating material that withstands the applied temperatures may be used in this invention. This ensures the integrity of these layers for high temperature molding. Preferably the material is capable of transferring a substantially uniform pressure (e.g., pressure differentials less than about 10%) when used in conjunction with the solid flowable media described hereinafter. It is also preferred that a porous material whose voids remain substantially open under pressures of about 1.38 MPa (200 psi) to about 20.7 MPa (3000 psi) and above may be used as the thermal barrier of this invention. It is preferred that the porous barrier layer's voids have a total volume of at least about 25%. This provides insulative protection and is used in the convective cooling layer 135 for passing fluids (e.g., cool nitrogen, argon) through the barrier. It is also preferred that these thermal barrier layers are flexible as this facilitates the forming of the thermal barrier layers around composite prepreg surfaces having compound curvatures.

It is preferred that these layers are about 0.5 cm to about 5 cm in thickness because these thicknesses typically provide a sufficient thermal drop in conjunction with the compliant glass layer without seriously inhibiting substantially uniform pressure transfer. Shifting planes of thicker insulation layers could crunch into the compliant glass layer. It is preferred that the thermal barrier layers be relatively uniform in thickness to ensure uniform pressure application. An especially preferred thermal barrier layer comprises at least two layers of substantially spherical beads that are joined together to form an integral structure. Two layers ensure an insulative void volume.

Substantially, spherical particles, such as glass beads, are an excellent insulator and provide voids for insulation and/or passage of cooling gases. By substantially spherical is meant an aspect ratio of less than about 2. Spherical beads can withstand very high compression loadings (e.g., 525 MPa, 70,000 psi). The contact points between individual beads offer a very small heat path through a multibead layer. After pressure has been applied, a relatively constant contact area is ensured. Deformation of the beads will cause a little higher heat transfer rate, but they will be effective until they fracture. An advantage of the spherical bead insulation is the large void volume, even when packed. Theoretical close packing of beads is based on several models. Void volumes for several models are as follows: face-centered cubic —26%; hexagonal close packed —26%; and body centered cubic —32%. For real world applications, beads settle in a random mix of packing patterns. In addition, slight movements of packs result in changes to packing patterns. Also, because beads are rarely perfectly round, void volumes are increased. When tightly packed, commercial beads have a void volume of about 30% to about 40%, typically about 37% when they are all nearly the same size.

A low temperature fluid (e.g., nitrogen) flowing into o through the voids provides excellent cooling properties. This is used for the convective cooling layer 135. Alternatively, coating the beads or filling of the void volume with a powdered radiation blocker (i.e., carbon black) reduces the radiative heat transfer. Additional and/or alternative benefit is obtained if the void volume, whether or not it is filled with powder, is evacuated as that reduces convective heat transfer.

Beads may be made of materials other than glass, such as steel shot and ceramics. The glass beads may also be hollow spheres, such as thick walled microballoons, if their compressive strength is adequate for the application (e.g., pressures desired). Both hollow beads and ceramic beads will provide additional insulation. Hollow glass, silica or ceramic spheres are excellent insulators as they are filled with gas. In addition, the void volume between the spheres provides additional insulation value which can be as much as that obtained with any voids within the spheres. Collectively, the total void content can be from 20% to 80% which includes the internal void volume of the spheres. Thermal conductivity the insulation layer can be about 2 Btu/(hr) (sq. ft.) (° F.) or less with Eccospheres No. FA-B ceramic microballoons from Emmerson-Cumming (Canton, Mass.). In addition, the beads may be coated with either a radiation reflective or absorbing coating to aid with insulation. Exemplary reflective coatings include metallic, chrome, aluminum, nickel and copper. Reflective coatings may transform to absorptive coatings during use and thus still remain insulative (e.g. copper to copper oxide). Exemplary absorptive coatings include copper oxide, carbon black and high temperature paint. Yet another radiation blocking alternative is opaque beads. Beads are selected that are compatible with the use to be performed. Conventional glass beads are suitable for use at temperatures near their softening point, 816° C. (1500° F.). Special glasses will increase or lower the use temperatures (e.g., several hundred degrees) as desired. Exemplary glass beads are 3000 (TM) beads and 3000E (TM) beads available from Potters Industries CK M.P. (Hasbrook Heights, N.J.).

In addition, any combination of the above coated, hollow etc. beads may be used (e.g., alternate layers) depending on the desired application, cost, etc.

At least one layer of very small size beads may be disposed on one or both sides of the above bead layers. This layer(s) would follow the filling of the irregular large bead surface with the smaller beads to form a reasonably flat surface. This aids in attaining a smooth surface on a molded part. The larger the beads that are near the molded part, the greater chance the molded part surface may have a dimpled look. In addition, these layers would protect any other layers (i.e., foil barrier layers) from rupturing. It is preferred that this bead layer is about 0.5 mm to about 1.7 mm because below about 0.5 mm, the flow path can become plugged and above 1.7 mm, the surface of the article to be molded may be made nonuniform by the molding pressure (unless intervening layers described below are used), although the part can be machined to provide a smooth surface.

In addition, or as an alternative to the small bead layer described above, a thin layer of material (e.g., fabric, padding) (e.g., #1581 fabric available from Airtech International, Carson, Calif.) about 0.2 mm (0.009 inch) to about 0.6 mm (0.027 inch) in thickness may be disposed on one or both sides of the insulative layer to provide a smoothing effect.

Typically, the layer of beads must be held in place during the molding process or at least until the molding pressure becomes sufficient to prevent their displacement. This is a problem with articles having vertical or curved surfaces. To facilitate layup beads can be formed into pads which may be laid over the article to be molded as a blanket. The material used to contain the beads can be stitched to keep the beads from rolling into one place, with resultant bare areas. This would resemble a quilt.

A flexible multidirectionally stretchable porous material such as tricot stretch fabric may be bonded to one or both sides of the bead layers. This facilitates the flexibility of the bead layers because as a layer of beads is conformed to a curved surface, the flexible material distributes the bending load over a greater area of the bead layer and thus reduces fracture of the bead layer.

An alternate preferred method for forming the pad is by lightly bonding the beads together. A flexible porous pad may be formed by applying a very thin layer of flexible adhesive, for example, PSA529 (TM) acrylic modified silicone (General Electric Co., Fairfield, Conn.) catalyzed with A-1100 (TM) catalyst, (Union Carbide, Danbury, Conn.) to a single layer of clean beads. Depending on the adhesive used, it may withstand the molding temperatures used. However, even if the adhesive does not withstand the molding temperature, once the beads are in place, they may be held in place by the pressurizing means used (e.g., solid flowable polymer described hereinafter). The beads are uniformly spread in a form to confine them. After air-drying, an excess of clean beads is poured onto the previous layer. This addition is made while the uncured resin is still tacky. An exemplary adhesive thickness is approximately 0.008 mm (0.0003 inches). But the adhesive may be thicker (e.g., 0.025 mm) or thinner (e.g., 0.005 mm) as required for larger or smaller beads. Excess beads may be removed from the surface by inverting the sheet after the adhesive has dried to a good tack. Additional adhesive can be sprayed over the surface of the above-described bead layer for bonding to another bead layer. After minimal drying, more beads may be poured over the surface; the solvent allowed to evaporate, and the excess beads poured off. This technique can be repeated until the desired bead layer thickness is attained.

Yet another preferred method comprises completely coating a quantity of beads by immersion in a dilute solution of the adhesive mixture. The beads are drained and then poured into a casting frame for drying. Removal of any residual liquid may be accomplished through a porous layer of fabric under the frame. This layer is removed after the adhesive has set sufficiently to hold the beads together as a pad. After the final addition of beads, the pad is placed in a circulating air oven to cure the adhesive. The adhesive can be formulated to remain tacky enough to enable it to be a pressure sensitive stock. It is then capable of easily sticking to any surface, including itself. Layup is simplified because the pad adheres to the outside of the article to be molded.

Sheets (e.g., pads) of the beads are easily cut into shapes to fit over an article. The flexible cured sheets can be contoured and butt spliced to form a continuous breather layer.

Several barrier layers (e.g., barrier 120, barrier 126, barrier 132, barrier 141) are typically used in this invention. Foil barrier 120 is used to separate the breather 113 and compliant glass layer 122. Foil barriers 126, 132 are used to encase the insulating layer 129.

The above assembly is typically contained within a barrier 141 which can withstand high temperatures (e.g., 1000° F. or above). The bag typically covers convective cooling vents 134 in the tool on which the part is being made. Although the barrier is typically referred to as gas impervious, small leaks may occur in a metal foil barrier, that is used with the solid flowable polymer pressure transfer media described below without deleterious effect because several of the above-described layers will inhibit the media intrusion.

There are a variety of metal foils that are suitable and the selection of the particular foil depends on the temperature to which the foil is exposed. Typically, molybdenum, stainless steel, aluminum and copper foils or alloys thereof are used. Aluminum is preferred at temperatures up to about 538° C. (1000° F.); copper may be used at temperatures between about 538° C. (1000° F.) and about 816° C. (1500° F.). Above about 816° C., high temperature alloys may be used. Stainless steel, for instance, can be used at temperatures up to about 1800° F. Superalloys are suitable for use at temperatures from about 2000° F. to about 2500° F. and above.

Although this invention has been described in terms of particular layers and a particular order of layers, one skilled in the art would realize that other layers and alternative layer configurations could be used. For example, for polymer matrix applications, it may be desirable to use thermoplastic material to provide a lower temperature compliant layer.

This compliant glass layer may be used in conjunction with a variety of conventional pressure causing or transferring means in order to mold a composite article. Examples include pressure pads, silicone bags and platen presses. A preferred pressure causing/transferring means is the solid flowable media and methods described in European Patent Application No. 87630020.4 entitled "Molding Method and Apparatus Using a Solid, Flowable, Polymer Medium" by Kromrey, the disclosure of which is hereby incorporated by reference and in commonly assigned U.S. application Ser. No. 829,048 entitled "Molding Method and Apparatus Using a Solid Flowable, Polymer Medium", now abandoned, the disclosure of which is hereby incorporated by reference. The preferred solid flowable polymer material is further described in U.S. Pat. No. 4,686,271 entitled "Hydraulic Silicone Crumb" by Beck et al, the disclosure of which is hereby incorporated by reference.

The medium's responsiveness to temperature and pressure coupled with its flowability and solid nature at molding temperatures enable it to be useful. These properties cause the medium to produce an advantageous, substantially uniform, controllable pressure on the surface of the article precursor to be molded. In a typical embodiment of the invention, the polymer is an unfilled silicone rubber particulate of $-4+30$ U.S. mesh sieve size (4.7–0.42 millimeter (mm)), which when pressurized, is sufficiently self-compliant to coalesce as an essentially void-free medium at a pressure of the order of 69 kPa (10 psi).

Typically, a silicone rubber is used as the pressurizing polymer. Most preferably, the rubber is an improvement on the type which is described in U.S. Pat. No. 3,843,601 to Bruner. See also U.S. Pat. No. 4,011,929 to Jeram et al. The disclosures of both patents are hereby incorporated by reference. Generally, the preferred materials are dimethylsilicones that have vinyl groups. They may be produced by conventional commercial procedures, including production from polysiloxanes using various vulcanizing techniques. Preferred materials which have been used thus far are the experimental unfilled silicone rubber materials designated as X5-8017, formerly No. 6360 B1 (more simply 8017 hereinafter), X5-8023 and X5-8800 by the Dow Corning Corporation (Midland, Mich.).

Another Dow Corning silicone rubber, No. 93-104, without its ordinary fillers (called "93-104" herein, nonetheless) is useful. The Polygel C-1200 silicone rubber Stauffer Chemical Company, Westport, Conn. U.S.A.), believed to be essentially the material which is described in the Bruner Pat. No. 3,843,601 is also useful with the present invention.

Other preferred materials are the vinylmethylsiloxane-dimethylsiloxane (VMS-DMS) polymers such as Dow Corning No. X5-8026 as described in commonly assigned copending application Ser. No. 907,946 entitled "High Temperature Solid Flowable Polymer Medium and Method of Molding Using the Same", the disclosure of which is hereby incorporated by reference as it is usable at high temperatures, (e.g., 316° C. (600° F.) 482° C. (900° F.)).

Most silicone rubbers are temperature limited for long term use, e.g., typically up to about 232° C. (450° F.). However, silicone resins of the vinylmethylsiloxane and silphenylene types have been successfully tested up to about 482° C. (900° F.). Fillers and other adulterants (such as the metal particulates described below) can be included with and within the medium, provided the essential behavior properties are maintained.

The preferred 8023 silicone rubber is characterized by low strength and high friability. By "high friability" is meant there is such low strength that moderate size solids tend to disintegrate into smaller particulates when subjected to modest mechanical forces, even rubbing between the fingers. The 8017 material has a Shore A hardness of less than 1 (Shore 00 hardness of 50-55) and compressive strength of the order of 70 kPa when measured on a 2.5 cm square by 1.27 cm thick specimen, and upon a compression deformation of about 40%, it shears into smaller particles. This behavior is contrasted with that of more conventional rubbers which have higher strength, greater resistance to deformation and greater elongation to failure. It has also be observed that preferred polymer useful with the present invention forced through a small orifice, or through a 1.1 cm diameter pipe as described below, has a tendency to disintegrate into smaller particulate. By example, it is found that over time, a nominal 30 mesh size powder having about 50 weight percent retained on a 40 mesh screen will change to one having only about 25 weight percent retained on 40 mesh.

The aforementioned behavior of the polymer media enables the fabrication of intricately shaped composite polymer parts with uniform properties under the controlled and independent application of uniform pressure and temperature. In one embodiment of the invention, the polymer has a Shore A hardness of less than about 15, typically less than 8, and desirably less than 1; the compressive strength is less than 1 MPa, and desirably less than 0.2 MPa.

The ability of the inventive medium to flow under molding pressure is believed to be especially reflective of the properties of a good medium. This characteristic allows redistribution of the medium both within and to and from the vessel; it enables control of the absolute level and variability of the pressure. And tests show it is that which distinguishes the materials of the present mediums from those which have been used heretofore in the pressure pad molding technique. The flowability property can inferentially be seen to be analogous to viscosity. But there is no evident standard test known for measuring this property of importance to the invention and therefore a test apparatus was created as described above comprised of a cylinder having downwardly movable piston to test the polymer portion of the medium. The cylinder is filled with the rubber or other medium being tested. A replaceable pipe extends from the side of the cylinder and discharges rubber onto a weighing scale, the weight being recorded as a function of time and the pressure applied to the rubber as measured by a transducer. The pipe is a smooth stainless steel tube of 1.1 cm inside diameter and nominally 32-64 RMS (root mean square) surface finish. The pipe length is chosen as desired, with 7.6 cm and 15.2 cm being preferred.

Thus, generally it can be said that the polymer will have flowability, i.e., mass transport can occur when molding pressures are applied. The preferred polymer, when tested in the apparatus described above using 10.3 MPa (1500 psi) and a 15.2 cm (6 inch) pipe, has a flow rate of at least 0.6 g/s, typically 6 g/s, and desirably more than 25 g/s.

Further description of the polymer is given below. A particulate elastomer is typically used in the practice of the invention. When the 8017 polymer is used as particulate solids, prior to the application of pressure the particulates are spaced apart at the article precursor surface. But when pressure is applied, the particles self-comply and coalesce into a continuous void-free body. With the addition of a eutectic alloy (or metal), the alloy fuses and conforms to the particle shape. Because of this and their inherent resilience, a uniform hydraulic-like pressure is applied to the article precursor surface. Tests show that the 6360 material without the metal additive will tend to coalesce upon the application of moderate compressive pressure, of the order of 70 kPa; at this point the interfacial boundaries between the particles are so essentially conformed that the compressed rubber becomes translucent instead of opaque. The 8017 material has a true density of 0.97 g/cc, an apparent bulk density of 0.5 g/cc as a −30 mesh size powder, and it is compressed to a coalesced translucent material with a density of 0.94–0.97 g/cc by the application of about 70 kPa. (Further compression of captured material, in the range 70 kPa to 13.8 MPa, shows it to have about 0.4% volume change per 10 MPa.) Under the above-described coalesced condition, there is believed to be little void, or gas (except absorbed gas) contained in the interstices between the particulates.

Thus, the preferred material, when used in particulate form, will be self-compliant and will tend to coalesce as an apparent void-free body below a pressure of 350 kPa, preferably 240 kPa; more preferably about 69 kPa.

Based on various molding tests and material property measurement, desirable results have been associated with medium having low strength, the ability to self-comply under molding level pressures, and the ability to flow and exhibit hydraulic-like behavior. Other silicone rubbers than 8017 have been used up to the date of this application, and it is within contemplation that there are still other organic polymers and other materials which are either known or can be developed which will carry out the essential features of the invention. To characterize the desirable properties associated with the good molding results, comparative tests have been run on various rubbers, in molding trials on actual composite articles, in the flow test apparatus described, and in standard apparatus.

Tests run on the granular 8017 material showed a maximum variation in pressure of as low as 2% at about 6.9 MPa nominal pressure; other useful materials produced pressure uniform within 10%. Addition of molten metal matrices does not adversely affect the above-cited property.

The usefulness of the materials is also evaluated according to the integrity of a molded finished product, it being well established that inspection will commonly show areas of low density or cracking where the proper application of pressure and temperature has not been achieved, during either the heating or cooling cycle.

The polymer has only been characterized according to the properties of some currently available materials; the data are insufficient to establish that the totality of measured properties in combination are necessary. On the contrary, to a significant extent, it is believed there is a redundancy and that they independently characterize the invention.

Returning to the compliant glass layer and process of this invention, the compliant layer is in conventional processes to protect the structural fibers in a composite from stress (e.g., maceration by crushing or shearing) during molding. Typically, pressure is applied by the means described above and optionally heat is applied through tooling to the article. Fluids (gases or liquids) may be released from the article. Fluids are typically vented through a breather layer to a vent which is connected to a vacuum line. Typically, when thermosetting resins (e.g. carbon-carbon) are used, the article precursor is exposed to elevated temperatures at about 121° C. (250° F.) to about 1093° C. (2000° F.) and even higher in order to cure or carbonize the article precursor. Temperatures used to fuse metal matrix composites or glass-ceramic matrix composites are from about 900° F. to 2500° F. Preferably, pressures of about 0.01 MPa (15 psi) to about 21 MPa (3000 psi) and above are applied to the article. The pressures and temperatures vary depending upon the particular article to be cured or molded, its composition, size, etc.

Figure 2:
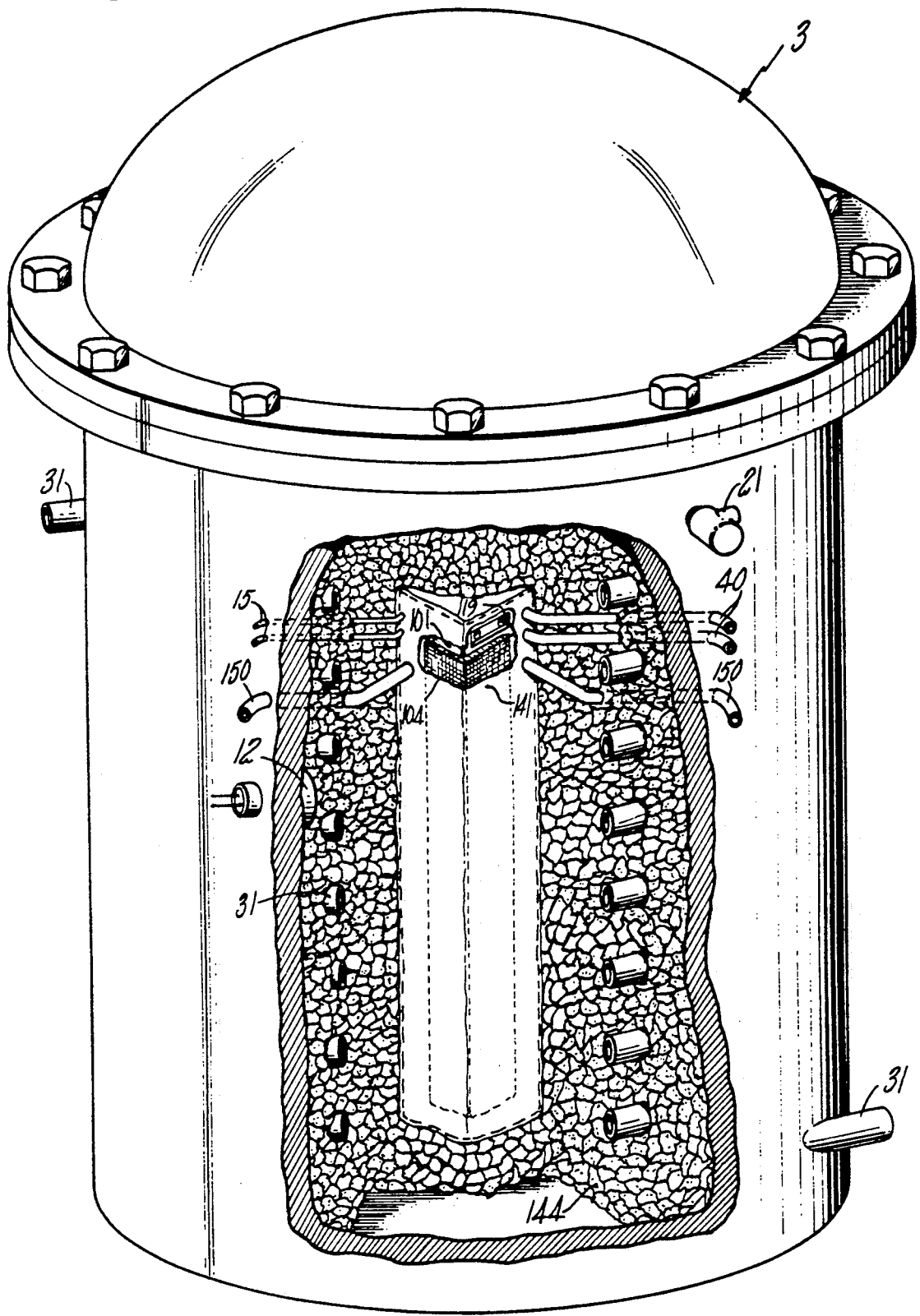
FIG. 2 illustrates a perspective view cutaway of an apparatus for performing the molding method of the present invention by controlling the temperature and pressure of the pressurizing medium.

FIG. 2 illustrates an especially preferred method according to the present invention, using the solid flowable media (described earlier) as a pressurizing means. Preimpregnated fibers or woven fabric layups are formed (e.g., by weaving, filament winding and tape wrapping) from fibers. The layups are impregnated with a glass, metal or resin (e.g., Borosil titanium, phenolic). At least two (a plurality) of the prepreg plies (or a preform) 104 are stacked onto a forming mold and placed in a pressure vessel 3 (e.g., stainless steel, alloy steel) and surrounded with a polymer medium (medium) 144.

A barrier layer 141 is disposed between the medium and the article to avoid contamination of the composite and medium. The barrier layer covers the insulation assembly described in FIG. 1 (i.e., release layer, breather). Typically, the breather is in communication with a vacuum line 40 via gas vent 119. This may be used to remove volatiles from the article 104. Typically, the convective cooling layer is in communication with ports 134 and gas supply and return lines 150 (as depicted in FIG. 1). The medium may be in contact with more or less of the composite precursor as is desired. Typically, the surface area of the composite precursor 104 not in contact with the medium is disposed (e.g., in contact) next to a tool 101 in order to provide (or maintain) a particular shape to the article 104. The pressure is preferably accomplished via the thermal expansion of the polymer medium 144. Such things as conventional pressure transducers 12 can be inserted in various places within the pressure vessel 3 to detect the requisite pressure. While any pressure can be used with the present invention, typically pressures up to 20.67 MegaPascals (MPa) (3000 psi) are used. However, it is believed pressures up to 138 MPa (20,000 psi) could be used.

Resistance heaters 15 are used to form (e.g., cure, carbonize, etc.) the composite to be molded 1. By raising the temperature of the tool, the heat is transferred to the article. Preferably, a fluid heating/cooling means 31 is used to change the pressure via the large thermal expansion of the pressurizing medium. Typically, the temperature used to expand the pressurizing medium is much less than that used to cure the article precursor. Regulation of the pressure increase can be achieved through a relief valve 21 or fluid heating/cooling means 31. Thus, tubing 31 can be used alternately to heat or cool the medium depending on whether hot or cold fluids are passed independently of the temperature in the cure region.

This invention provides a compliant glass layer that facilitates isostatic molding of composites at temperatures in excess of 1000° F. The use of isostatic molding enables the use of lightweight tooling since forces are substantially equalized on all surfaces of the tooling. The insulative effect of all the layers significantly reduces the amount of energy required to mold high temperature articles. In addition, the molding process facilitates control of thermal gradients in the pressure chamber.

Although this invention has been shown and described with respect to detailed embodiments thereof, it will be understood by those skilled in the art that various changes in form and detail thereof may be made without departing from the spirit and scope of the claimed invention.

I claim:

1. A method for molding a high temperature composite comprising:
    (a) providing a compliant layer of softened material selected from the group consisting of glass, ceramic and mixtures thereof;
    (b) applying heat to a composite precursor; and
    (c) causing said layer of softened material to apply pressure substantially uniformly to said composite precursor.

2. The method as recited in claim 1 wherein said compliant layer is about 0.5 cm to about 2 cm thick.

3. The method as recited in claim 1 wherein the step of providing a compliant layer of softened material includes applying heat to the material of said layer such that said material is softened, said material of said compliant layer having a softening temperature less than that of the composite matrix.

4. The method as recited in claim 1 wherein the step of providing a compliant layer of softened material includes applying heat to the material of said layer such that said material is softened, said material of said compliant layer having a softening temperature about 50° F. to about 300′ F. less than that of said composite matrix.

5. The method as recited in claim 1 wherein the step of providing a compliant layer of softened material includes applying heat to the material of said layer such that said material is softened, said material of said compliant layer having a softening temperature about 200° F. to about 300° F. less than that of said composite matrix.

6. The method as recited in claim 1 wherein the step of providing a compliant layer of softened material includes applying heat to the material of said layer such that said material is softened, said compliant layer comprising at least two glass layers, said glass layers having different softening points.

7. The method as recited in claim 1 wherein said composite is selected from the group of matrix composites consisting of glass, ceramic, and mixtures thereof.

8. The method as recited in claim 1 wherein said composite is a metal matrix composite.

9. The method as recited in claim 3 wherein said step of applying heat to said composite precursor also includes said step of applying heat to the material of said layer.

* * * * *